United States Patent [19]

Jones

[11] 3,869,507

[45] Mar. 4, 1975

[54] PREPARATION OF 5-FLUORO-2-METHYL-1-(P-METHYLSULFINYLBENZYLIDENE)-INDENYL-3-ACETIC ACID

[75] Inventor: Howard Jones, Holmdel, N.J.

[73] Assignee: Merck & Co., Inc., Rahway, N.J.

[22] Filed: Oct. 3, 1973

[21] Appl. No.: 402,943

[52] U.S. Cl. .............................. 260/515 A, 260/470
[51] Int. Cl. ............................................ C07c 147/00
[58] Field of Search ............................. 260/515, 470

[56] References Cited
UNITED STATES PATENTS 3,312,730   4/1967   Winter et al. ....................... 260/473
3,737,455   6/1973   Shen et al. ......................... 260/520

OTHER PUBLICATIONS

Wadsworth et al. Jour. Amer. Chem. Soc., vol. 83 (1961), pp. 1733–1738.

*Primary Examiner*—James A. Patten
*Attorney, Agent, or Firm*—Mario A. Monaco; Harry E. Westlake, Jr.

[57]        ABSTRACT

Process for the preparation of 5-fluoro-2-methyl-1-(p-methylsulfinylbenzylidene)-idenyl-3-acetic acid, by reacting 5-fluoro-2-methyl-indane-1,3-dione with a dialkoxy phosphonoacetate anion, reaction with a methylsulfinylbenzyl compound followed by hydrolysis.

6 Claims, No Drawings

PREPARATION OF 5-FLUORO-2-METHYL-1-(P-METHYLSULFINYLBENZYLIDENE)-INDENYL-3-ACETIC ACID

This invention is directed to the preparation of 5-fluoro-2-methyl-1-(p-methylsulfinylbenzylidene)-indenyl-3-acetic acid.

BACKGROUND OF THE INVENTION

The above mentioned -indenyl-3-acetic acid is a known compound having anti-inflammatory activity as described in U.S. Pat. No. 3,654,349. In the past, this compound has been prepared by condensing an appropriate substituted benzaldehyde with an acetic acid ester in a Claisen Reaction or with an α-halogenated propionic acid ester in a Reformatsky Reaction. The resulting unsaturated ester was reduced and hydrolyzed to give a β-aryl propionic acid which was ring closed to form the indanone. The aliphatic acid side chain was then introduced by a Reformatsky or Wittig Reaction and the 1-substituent was introduced into the resultant indenyl acetic acid or ester by reacting said acetic acid derivative with an aromatic aldehyde or ketone of the desired structural formula and dehydrating to form the desired indenyl acetic acid.

It is an object of this invention to provide a new process for preparing 5-fluoro-2-methyl-1-(p-methylsulfinylbenzylidene)-indenyl-3-acetic acid.

DETAILS OF THE INVENTION

In accordance with this invention, it has been found that the subject compound can be readily prepared by the novel combination of several chemical reaction steps. Accordingly, 5-fluoro-2-methyl-indane-1,3-dione is reacted with a dialkoxy phosphonoacetate anion to form 5-fluoro-2-methyl-ind-2-ene-1-one-3-acetic acid ester and subsequently converted to the desired compound by the nucleophillic addition of a p-methylsulfinylbenzyl compound to the carbonyl of the 5-fluoro-2-methyl-ind-2-ene-1-one-3-acetate ester, followed by hydrolysis of the ester.

More specifically, 5-fluoro-2-methyl-indane-1,3-dione is reacted with an anion of dialkoxyphosphonoacetate (formed by the reaction of a dialkoxyphosphonoacetate or a monoalkoxymonoaroxyphosphonoacetate with a very strong base) in the presence of an inert solvent. The reaction temperature may be from 0° to 100°C but preferably 20° to 30°C. Such solvents as benzene, hexane, heptane, ether or tetrahydrofuran may be readily employed in the system. Preferably, the phosphonate is the di-($C_{1-6}$ alkoxy) phosphonoacetate such as the dimethoxy, diethoxy or dipropoxy phosphonoacetate but especially the dimethoxy and diethoxy phosphonoacetates. The strong base employed in the reaction with the phosphonate may be an alkali hydride such as sodium or potassium hydride, alkali metal in benzene, butyl lithium, sodamide in liquid ammonia, and like substances capable of forming the anion reactant. Although the time of reaction is not critical and accordingly the reaction may be carried out from 1 to 12 hours, it is preferred to carry out the reaction for up to 4 hours. The concentration of dialkoxy phosphonoacetate, strong base and indane-1,3-dione is not critical and accordingly more or less than equal molar ratios of each may be used. It is preferred, however, to use from 0.5 to 2 mole of dialkoxyphosphonoacetate per mole of indane-1,3-dione and especially 1 to 1.2 moles. The ester moiety of the 5-fluoro-2-methyl-ind-2-ene-1-one-3-acetic acid ester thus formed is used merely as a protecting group for the subsequent reaction. Accordingly, the ester (derived from the phosphonate compound) may be any organic ester forming group such as alkyl, preferably of from 1–6 carbon atoms, (methyl, ethyl, butyl), ar-alkyl such as phenylalkyl of from 7–12 carbon atoms (i.e., benzyl, phenethyl) or aryl such as phenyl. Preferably, the ester is derived from an alkyl of from 1–6 carbon atoms and especially methyl or benzyl.

The nucleophillic addition of the p-methylsulfinylbenzyl compound can be readily carried out by either the Grignard Reaction or the Wittig Reaction. In the case of The Grignard Reaction, the ester of 5-fluoro-2-methyl-ind-2-ene-1-one-3-acetate is, for example, reacted with a Grignard reagent prepared by reacting a p-methylsulfinylbenzyl halide (i.e., chloride or bromide) and magnesium at a temperature of from 0° to 100°C for a period of time of from 1 to 24 hours, but preferably at a temperature of from 30° to 50°C for 8 to 10 hours. This reaction can be carried out in the presence of an inert solvent such as ether, THF, or 1,4-dioxane. The Grignard reagent may, if desired, then be isolated by techniques well known to the art, subsequently reacted with the acetate compound in the presence of an inert solvent such as benzene, ether or tetrahydrofuran at a temperature of 0° to 100°C for a period of 1 to 15 hours and then a dehydrating agent such as phosphorous pentoxide, phosphorous pentachloride at 20° to 100°C. Preferably, however, the reaction between the Grignard reagent and acetate compound is carried out in the presence of an inert solvent such as ether or tetrahydrofuran at a temperature of 0° to 20°C, for a period of 1 to 12 hours, and then dehydrated in the presence of a dehydrating agent such as phosphorous pentoxide or p-toluenesulfonic acid, at 60° to 80°C, for 0.25 to 2 hours in benzene. Alternatively, the nucleophillic addition may be carried out by the well known Wittig Reaction. For example, the reaction may be carried out by the reaction of the appropriate aryl alkylidenephosphorane with a 5-fluoro-2-methyl-ind-2-ene-1-one-3-acetate. More specifically, the reaction may be carried out by reacting the 5-fluoro-2-methyl-ind-2-ene-1-one-3-acetate with p-methylsulfinylbenzylidene phosphorane in the presence of an inert solvent such as benzene, hexane, ether or tetrahydrofuran for a period of time of from 1 to 8 hours. Concentration of reactants is not critical and accordingly one may use from 1.0 to 1.5 moles of phosphorane to one mole of ketone. The thus prepared ester of 5-fluoro-2-methyl-1-(p-methylsulfinylbenzylidene)-indenyl-3-acetate is then hydrolyzed. The hydrolysis may be carried out using bases under conditions well known to the art for hydrolysis of an ester. Organic or inorganic bases such as aqueous alkali or alkali earth hydroxides, pyridines, alkali or alkali earth carbonate or bicarbonate; such as calcium hydroxide, sodium hydroxide, calcium carbonate, sodium bicarbonate and the like, but preferably aqueous alcoholic alkali hydroxide (sodium hydroxide, potassium hydroxide) at temperatures of from 0° to 120°C and preferably from 60° to 80°C. Similarly, the concentration of reactants is not critical. However, for the sake of higher yields, one would preferably use between 2 to 3 moles of base to one mole of acetate compound. The reaction may be carried out in a variety of solvents, preferably under aqueous conditions of aqueous alcoholic conditions such as aqueous sodium carbonate, sodium hydroxide or mixture of water and organic bases such as aqueous pyridine or morpholine. The time of reaction is not critical and the reaction is preferably carried out until essentially complete hydrolysis takes place which usually occurs between 0.5 and 1.0 hours. Following hydrolysis, the alkaline solution is made acidic.

The starting material for this invention; namely, the 5-fluoro-2-methyl-indane-1,3-dione can be prepared by hydrogenating nitrophthalic acid to 4-aminophthalic acid in the presence of platinum on carbon, zinc and acetic acid or iron and hydrochloric acid in the presence of an inert solvent such as ethyl acetate, methanol or ethanol at a temperature of 20° to 60°C, preferably at or about room temperature under pressures of from 1 to 30 atmos, but especially, 1 to 2 atmos, until the required amount of hydrogen is taken up. The 4-aminophthalic acid is then converted to the corresponding, 4-fluorophthalic acid by well known means for converting an amino group to a fluoro group. For example, the reaction may be carried out by dissolving the 4-aminophthalic acid in fluoroboric acid at temperatures of from 0° to 10°C and subsequently adding sodium nitrite to diazotize the amine, raising the temperature to decompose the diazonium salt and cause the formation of the 4-fluorophthalic acid. This latter compound is then converted to its corresponding diester such as the $C_{1-5}$ dialkyl ester (i.e. diethyl ester) by means well know to the art. For example, the 4-fluorophthalic acid may be reacted in the presence of ethanol in a small quantity of concentrated sulfuric acid and refluxed for a sufficient period of time to form the appropriate diester. The 4-fluorophthalic diester thus formed is then readily converted to its corresponding 5-fluoro-2-methyl-indanone-1,3-dione by admixing the diester with methanol and sodium and then slowly added to a $C_{1-5}$ alkyl ester of propionic acid such as ethylpropionate and the solution refluxed for a period of time such as from 2 to 6 hours to form the desired dione.

The following examples are given by way of illustration.

EXAMPLE 1

A. 4-Aminophthalic Acid

4-Nitrophthalic acid (0.2 mole) [Gaz. Anin. et al. 329–341 87 (1957)] is hydrogenated over 10° Pd/C in ethyl acetate (1 l.) at room temperature and 42 p.s.i. until the theoretical uptake of 3 moles of hydrogen have been taken up. The catalyst is filtered off and the solvent evaporated down to dryness to give 4-aminophthalic acid.

B. 4-Fluorophthalic Acid

4-Aminophthalic acid (0.2 mole) is dissolved in 200 ml. of 48% fluoroboric acid and cooled to 0° to 5°C in an ice-ethanol bath. Keeping the temperature below 10°C the amine is diazotized by adding a solution 14.7 g. (0.21 mole) of sodium nitrite in small portions with stirring. The solution is allowed to stand at 10°C for 1 and is then warmed to room temperature to decompose the diazonium salt. After the evolution of nitrogen has ceased the solution is extracted into ethyl acetate (3 × 200 ml.) and dried ($MgSO_4$). The solution is filtered, evaporated and the acid recrystallized from alcohol.

C. Diethyl 4-fluorophthalate

The acid above (0.2 mole) in ethanol (200 ml.) and 0.5 ml. concentrated sulfuric acid is refluxed for 3 hours and evaporated to 1/10 volume. The organics are taken up in ether (200 ml.) and the ether solution is washed well with saturated sodium bicarbonate solution (3 × 100 ml.), water (100 ml.), separated and dried ($MgSO_4$). The organic solution after filtration is evaporated to dryness to give the subject compound as a liquid.

D. 5-Fluoro-2-methylindane-1,3-dione

To a mixture of the diethyl ester above (0.2 mole) and metallic sodium (0.4 mole) is added slowly, with cooling and stirring, ethyl propionate (0.4 mole). The solution is then refluxed for 4 hours and washed with 500 ml. of ether. The precipitated solid is filtered, dissolved in water (300 ml.), washed with ether (100 ml.) and the aqueous layer acidified with sulfuric acid until the evolution of carbon dioxide ceases. The mixture is extracted into $CH_2Cl_2$ (3 × 200 ml.), the $CH_2Cl_2$ solution washed with water (2 × 100 ml.), dried ($MgSO_4$), filtered and evaporated to dryness to give an oil which crystallizes on cooling.

E. Methyl 5-fluoro-2-methyl-ind-2-ene-1-one-3-acetate a. Methyl bromoacetate (0.1 mole) is refluxed with triethyl phosphite (0.1 mole) in dimethoxyethane (250 ml.) for 2 hours. The reaction mixture is evaporated to dryness and the product fractionally distilled under reduced pressure to give methyl diethoxyphosphonoacetate.

b. To a solution of methyl diethoxyphosphonoacetate (0.1 mole) in dimethoxyethane (100 ml.) is added a 50% dispersion of sodium hydride in mineral oil (0.1 mole) and the reaction stirred at room temperature for 1 hour. This solution is then added at 15°C to a solution of 5-fluoro-2-methyl-1,3-indane-dione (0.1 mole) in dimethoxyethane and the reaction left for 3 hours. Water is then added (20 ml.) and the methyl (5-fluoro-2-methyl-ind-2-ene-1-one-3-acetate) is extracted and separated from its 6-fluoro isomer by column chromatography on silica gel, a column 3 ft. × 2 in volume.

F. p-Methylsulfinylbenzylbromide

N-bromosuccinimide (0.1 mole) is added to a solution of p-methylthiotoluene (0.1 mole) in carbon tetrachloride (200 ml.) and the solution is refluxed for 2 hours. The reaction mixture is filtered, evaporated to dryness and put on a column of $SiO_2$ (18 in. × 1 in.). Elution with mixtures of n-hexane-ether gives fractions which contain pure p-methylthiobenzyl bromide as an oil.

The above compound (0.1 mole) is oxidized at room temperature in acetone-water (10:1, 200 ml.) with sodium metaperiodate (0.4 mole). The reaction being followed by t.l.c. in n-hexane to prevent over oxidation.

The product is isolated by evaporating to 1/3 volume and washing this reaction product in ether (100 ml.) well with water. The ether layer is dried ($MgSO_4$), filtered and evaporated to give the solid p-methylsulfinylbenzylbromide.

Molecular bromide under light can be used in place of N-bromosuccinimide in the first part.

G. Methyl 5-fluoro-2-methyl-1-(p-methylsulfinylbenzylidene)-indenyl-3-acetate Methyl 5-fluoro-2-methyl-ind-2-ene-1-one-3-acetate (0.1 mole) obtained in E is stirred at 10°C in benzene (300 ml.) under nitrogen while a Grignard reagent made from p-methylsulfinylbenzyl bromide (0.15 mole) and magnesium (0.2 g.) in tetrahydrofuran (100 ml.) is added over 30 minutes. The solution is then stirred at room temperature for 18 hours, washed well with saturated ammonium chloride solution (200 ml.) and the benzene layer separated. The benzene solution is dried (MgSO$_4$), filtered and phosphorous pentoxide (5 gm.) added to the solution. The solution is stirred and refluxed for 2 hours and then filtered. The benzene solution is washed well with saturated sodium bicarbonate solution (2 × 50 ml.), water (1 × 50 ml.), dried (MgSO$_4$) and filtered. The benzene layer is evaporated to dryness to give methyl 5-fluoro-2-methyl-1-(p-methylsulfinylbenzylidene)-indenyl-3-acetate.

H. 5-Fluoro-2-methyl-1-(p-methylsulfinylbenzylidene)-indenyl-3-acetic acid

The ester (0.1 mole) is dissolved in 1N aqueous alcoholic sodium hydroxide (3:1, 100 ml.) and stirred at room temperature for 2 hours under nitrogen. The alcohol is evaporated off at 20°C and with cooling and rapid stirring the alkaline aqueous solution is made acid with 1N hydrochloric acid. The solid product is filtered off and dried with phosphorous pentoxide at 20°C. It can be recrystallized from mixtures of ethyl acetate-n-hexane.

I. Methyl 5-fluoro-2-methyl-1-(p-methylsulfinylbenzylidene)-idenyl-3-acetate The benzyl bromide (0.1 mole) from Example 1F is mixed with triphenyl phosphine (0.1 mole) in tetrahydrofuran (20 ml.) in a sealed tube and left at room temperature for 2 days. p-Methylsulfinylbenzyltriphenylphosphine bromide is filtered off.

To the above phosphine bromide (0.05 ml.) in liquid ammonia (50 ml.) is slowly added with stirring at −80°C freshly made sodamide (0.05 ml.) and benzene (50 ml.) is added and the liquid ammonia is allowed to boil away. The sodium bromide is filtered off and the salt-free solution is added at room temperature to a stirred solution of the 5-fluoro ketone from Example 1E (0.045 ml.) in dimethoxyethane (60 ml.) over 20 minutes. The ppt. triphenyl phosphine oxide is filtered off and the evaporated filtrate chromatographed on a column of silica gel (2 ft. × 1.5 in.) using solution of chloroform-ethanol to separate the cis-benzylidene compound from any trans- benzylidene compound. In this way, cis- methyl-5-fluoro-2-methyl-1-(p-methylsulfinylbenzylidene)-indenyl-3-acetate is made.

Similarly, the ester from 1I above is hydrolyzed in accordance with the procedure of 1H.

What is claimed is:

1. A process of preparing 5-fluoro-2-methyl-1-(p-methylsulfinylbenzylidene)-indenyl-3-acetic acid which comprises the steps of:

a. reacting 5-fluoro-2-methyl-indane-1,3-dione with anion of a dialkoxyphosphonoacetate or monoalkoxymonoaroxyphosphonoacetate to form 5-fluoro-2-methyl-ind-2-ene-1-one-3-acetic acid ester;

b. reacting said indanone acetate with a p-methylsulfinylbenzyl magnesium halide followed by dehydration or with a p-methylsulfinylbenzylidenephosphorane to form an ester of 5-fluoro-2-methyl-1-(p-methylsulfinylbenzylidene)-indenyl-3-acetate; and c. hydrolyzing said indenyl-3-acetate to form the desired product.

2. The process of claim 1 wherein Step (b) is carried out with a p-methylsulfinylbenzylmagnesium halide followed by dehydration.

3. The process of claim 1 wherein Step (b) is carried out with a p-methylsulfinylbenzylidenephosphorane 4. The process of claim 1 wherein Step (a) is carried out with methyl diethoxyphosphonoacetate at a temperature of from 30° to 60°C; Step (b) is carried out with a p-methylsulfinylbenzyl magnesium halide followed by dehydration or an alkylidene phosphorane; and Step (c) is carried out with a base followed by acidification.

5. The process of claim 1 wherein Step (b) is carried out with p-methylsulfinylbenzyl magnesium chloride at a temperature of 0° to 40°C; and Step (c) is carried out with an aqueous alkali hydroxide at or about room temperature followed by acidification.

6. The process of claim 1 wherein Step (b) is carried out with p-methylsulfinylbenzylidenetriphenylphosphorane at a temperature of from 0° to 10°C; and Step (c) is carried out with an aqueous alkali hydroxide at or about room temperature followed by acidification.

* * * * *